Dec. 16, 1941.  J. ERICKSON  2,266,014
TIMING DEVICE
Filed Oct. 12, 1938  2 Sheets-Sheet 1
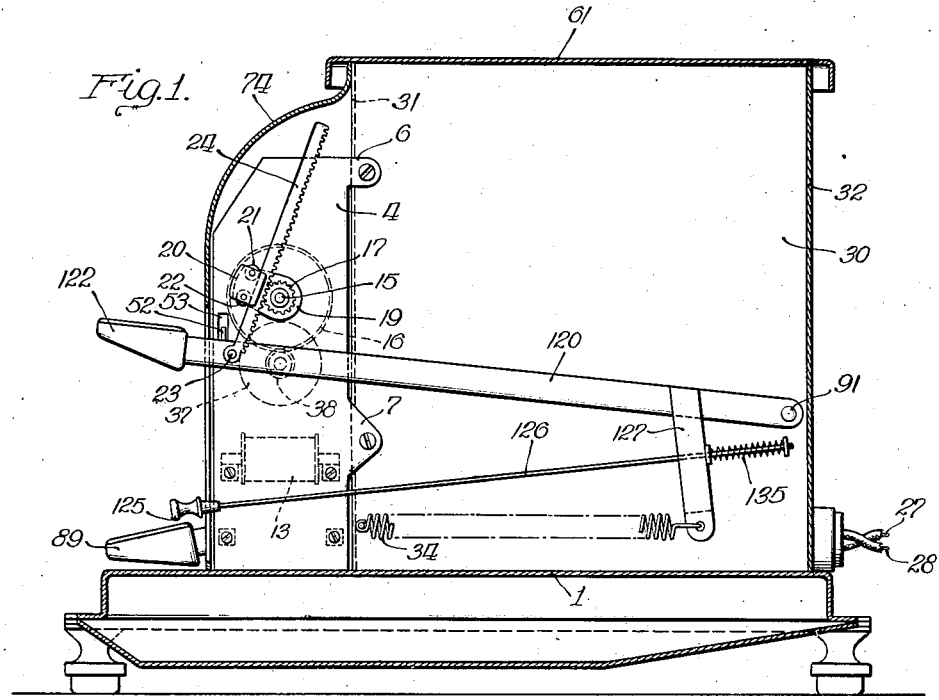
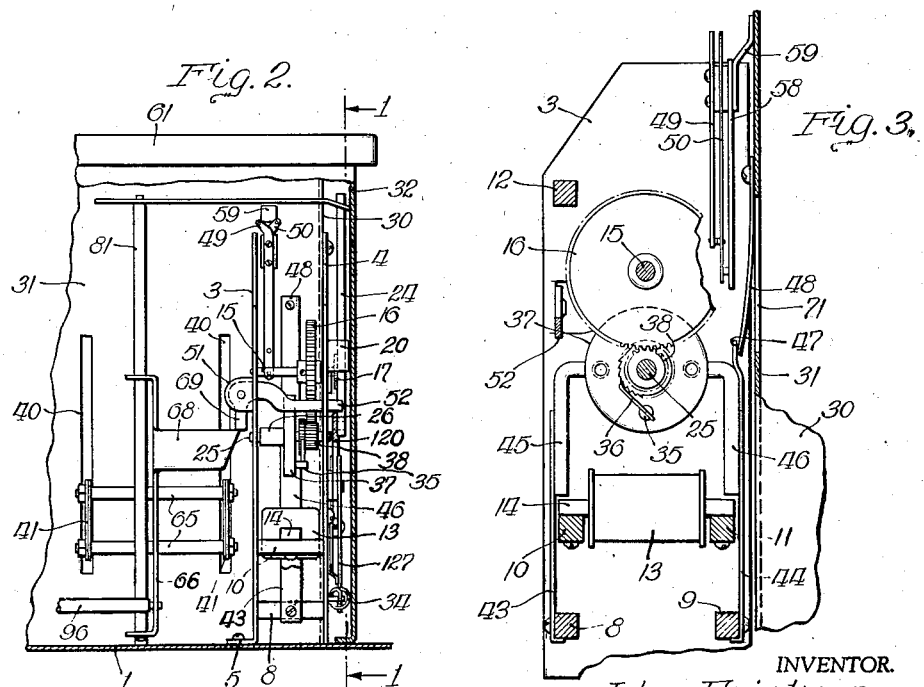
INVENTOR.
John Erickson
BY Richardson & Auer
ATTORNEYS.

Dec. 16, 1941.   J. ERICKSON   2,266,014
TIMING DEVICE
Filed Oct. 12, 1938   2 Sheets-Sheet 2
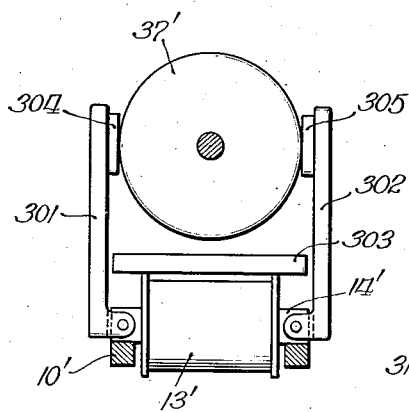
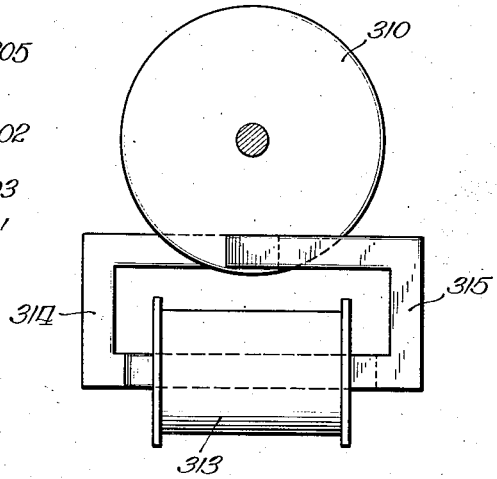
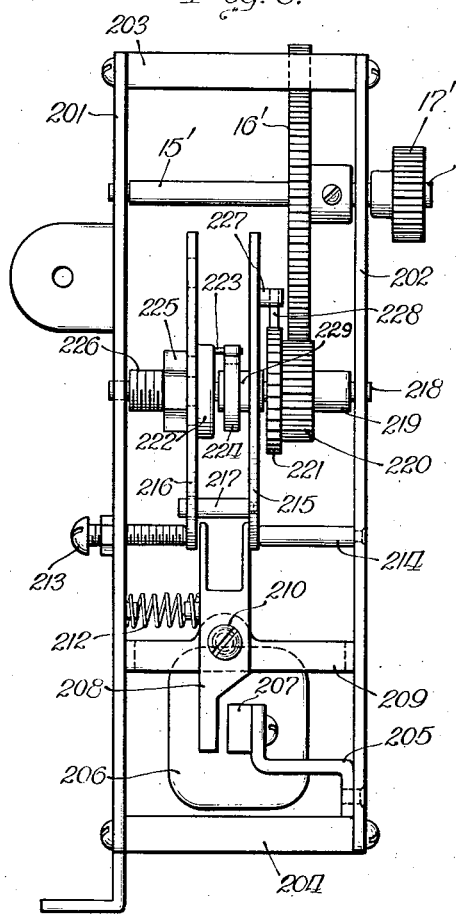
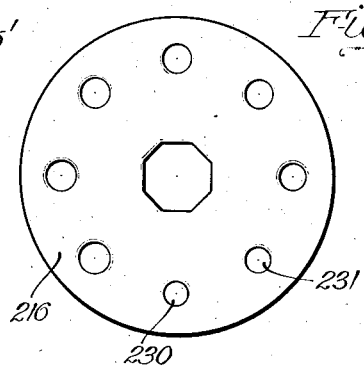
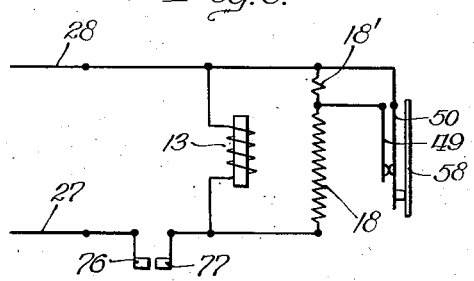
INVENTOR.
John Erickson
BY Richardson and Auer
ATTORNEYS.

Patented Dec. 16, 1941

2,266,014

UNITED STATES PATENT OFFICE 2,266,014

TIMING DEVICE

John Erickson, Chicago, Ill.

Application October 12, 1938, Serial No. 234,602

28 Claims. (Cl. 161—16)

The present invention relates in general to improvements in timing devices, and as shown herein comprises a new and improved timing device for an automatic bread toaster. The invention is not confined to automatic toasters, however, as it provides a timing device capable of use in a variety of situations where the accurate and reliable measurement of a comparatively short time interval is desired.

The invention and the various features thereof will be described hereinafter with reference to the accompanying drawings, in which—

Fig. 1 is a section through a well known type of automatic toaster, showing a side view of the timing device as installed;

Fig. 2 is a partial section through the same toaster, showing the timing device from the front;

Fig. 3 is a section through the timing device, showing certain parts that cannot be seen clearly in Figs. 1 and 2;

Figs. 4 and 5 show modified forms of the magnetic structure shown in Fig. 3;

Fig. 6 is a front view of a somewhat different form of timing device which may be substituted for the one shown in Figs. 1, 2, and 3;

Fig. 7 shows a side view of the disc 216, forming part of the timer shown in Fig. 6; and Fig. 8 is a diagrammatic circuit drawing of an automatic toaster equipped with a timing device according to the invention.

Referring first to Figs. 1, 2, and 3, the automatic toaster and timing device therein shown will be described.

As mentioned hereinbefore, the automatic toaster to which the invention is applied may be of well known construction, of the type shown and described in the United States patent to Forbes, No. 1,665,735, for example. As this toaster is fully disclosed in the patent, only so much thereof as is necessary to explain the operation of the timing device in controlling the toaster is shown herein.

The toaster comprises a base 1, an outer casing 32 supported on the base and including the front cover 74, and the top 61. Within the outer casing is an inner casing containing the heating elements and defining a toasting chamber. The inner casing includes two side walls such as 30, Figs. 1 and 2, which are spaced away from the outer wall 32, a front end wall 31, and a rear end wall (not shown). There is a considerable space between the front cover 74 and the front end wall 31 of the inner casing in which the timing device and certain other operating parts are located. Fig. 1 is a section taken between the right hand inner and outer walls, and exposes the parts which are located between these walls. Fig. 2 is a partial front view with the front cover 74 removed, exposing the timing device and other parts.

Within the toasting compartment there is located a slice support having sheet metal bottom members which include vertical sections 41 extending through slots 40 in the front end wall 31. These sections 41 are rigidly secured to the bracket 66 by means of spacers 65 and two rods threaded and fitted with nuts at both ends, as shown. The bracket 66 is slidably mounted on a vertical rod or post 81, and is moved up and down on said post to raise or lower the slice support by means of a horizontal rod 96. The latter is rigidly secured to a lever 89, which is located between the left hand inner and outer side walls of the casing, and which is similar to lever 122, Fig. 1. This lever 89 is equipped with a coil spring which tends to raise the lever and the slice support. When the lever 89 is depressed, the slice support is lowered to the position shown in Fig. 2, where it is retained by the engagement of the extension 68 on bracket 66 with the detent 69. The latter is controlled by the timing device in a manner which will be explained in detail.

The foregoing brief description of the toaster will be sufficient to enable the main features to be understood, which is all that is necessary for an understanding of the timing device itself and the manner in which it cooperates with the toaster. Further details regarding the toaster construction may be had by referring to the previously mentioned Forbes patent.

The various parts of the timing device are mounted on a frame comprising the plates 3 and 4, which are rigidly held together by square posts or spacers 8 and 9 at the bottom and 12 at the top. The latter is omitted from Fig. 2 to avoid obscuring other parts. The plates may be secured to these posts by means of countersunk machine screws. There are also two cross members 10 and 11, on which the electromagnet 13 is mounted, which afford additional rigidity to the frame. The frame is secured to the toaster by means of two ears 6 and 7, Fig. 1, which overlap the side wall 30 and are fastened to it by screws, as shown, and by means of a bent-over portion 5 of frame plate 3, which is fastened to the base 1 by a screw, as shown in Fig. 2.

The shaft 15 has bearings in the frame plates 3 and 4 and carries the gear wheel 16 inside the frame and the pinion 17 outside the frame. The latter is clearly seen in Fig. 1. Both the gear 16 and pinion 17 are fixed to the shaft. The pinion 17 is engaged by the rack 24, which is held against the pinion by two rollers 21 and 22. These rollers are supported in a U-shaped frame 20, one side of which, indicated at 19, extends to the rear and is pivoted on the shaft 15 between the pinion 17 and the frame plate 4.

The rack 24 is pivoted on the lever 120 at 23, and the lever in turn is pivoted on the rod 91 which extends through both side walls of the inner casing. The end of the lever extends out through a slot in the front cover 74 and is equipped with a handle 122. The lever 120 is urged toward the position shown in the drawings by a heavy coil spring 34, which is tensioned between the arm 127 and a short pin or stud on the side wall of the casing, as shown.

The usual adjusting device for the timer comprises the rod 126 and handle 125, the latter having a conical portion which is held in one of a plurality of notches in one side of the slot in the front cover 74 by means of the spring 135. This adjusting device is fully disclosed in the patent.

The shaft 25 is fixed in frame plates 3 and 4. Rotatably mounted on shaft 25 is a wheel or disc 37 which is carried on the hub 26. The wheel 27 is of magnetic material (iron or soft steel) and has a smooth periphery. Alongside the wheel 37 there is a combination pinion and ratchet wheel 38, which is rotatable on shaft 25. The pinion section is in engagement with gear wheel 16, while the ratchet section is engaged by a pawl in the form of a flat spring 36. The latter is supported on a stud 35 which is fixed to the wheel 37. From the foregoing it will be seen that the pinion 38 can rotate in a clockwise direction, as seen in Fig. 3, independent of the wheel 37, but when the pinion is rotated in a counterclockwise direction, it will drive the wheel 37 through the medium of the ratchet and the spring or pawl 36.

Associated with the wheel 37, is an electromagnet comprising a core 14 and coil 13. The core of the magnet is supported on the two cross members 10 and 11 by means of small machine screws. The magnet has two armatures 45 and 46, supported on stiff springs 43 and 44, which are secured to spacers 8 and 9, as shown. These springs have practically no tension, just enough to hold the armatures 45 and 46 in light contact with the periphery of wheel 37. The magnetic circuit includes the core 14, the armatures 45 and 46, and the wheel 37. To avoid short-circuiting of magnetic flux the spacers 10 and 11 and the frame plates 3 and 4 should be of non-magnetic material.

The spring 44 has an extension or tongue 47, which is engaged by a bi-metallic strip 48 secured to the end wall 31 of the inner casing. When the toaster is cold this bi-metallic strip is under considerable tension and presses the armature 46 against the wheel 37. Also mounted on the end wall of the inner casing is a pair of contact springs 49 and 50 which are normally held closed by the bi-metallic strip 58. The strip 58 and the contact springs 49 and 50 are supported on a bracket 59.

The detent 69 forms part of a bell crank lever which is pivoted on a part 51 of frame plate 3. The lever passes through plate 3 behind part 51 and has a horizontal arm or trigger portion 52 which lies in a slot 53 in the frame plate 4, through which the end projects into the path of lever 120. In the drawings, Figs. 1 and 2, the lever 120 is shown just as it engages the trigger 52 in its upward movement under the force applied by spring 34. As the lever moves upward from the position in which it is shown, it rotates the bell crank lever and moves detent 69 out of the path of the extension 68, which releases the slice support. Shortly after this occurs, the trigger 52 engages the upper end of the slot 53, and further movement of lever 120 is prevented.

The circuit connections for the complete toaster are shown in Fig. 8. The conductors 27 and 28 are conductors of the usual flexible cord and connect to terminals at the rear of the toaster. The heating elements 18 and 18' are bridged across these terminals in series with the switch contacts 76 and 77, which are open or closes, depending on the position of lever 89, as described in the Forbes patent. The magnet winding 13 is of high resistance and is connected in parallel with the heating elements. As intimated above, 18' may be a short section of the usual heating winding, or it may be an additional heating winding having its coils interspersed with those of the usual winding. A separate resistance may also be used, and in this case it may be inductive. The element 18' is normally short-circuited at contact springs 49 and 50, and is connected in the circuit by opening of the contact at these springs under control of the bi-metallic strip 58.

The operation of the timing device in timing a toasting interval will now be described. It will be assumed that the operating levers 122 and 89 are both in their extreme upper positions, which is the normal condition. The cord 27—28 may now be plugged into a convenient outlet, which gives access to commercial alternating current. A couple of slices of bread are next inserted in the slice support, after which levers 89 and 122 are depressed.

The operation of lever 89 lowers the slice support into toasting position and also closes the switch comprising contacts 76 and 77. Current is thus supplied to the heating element 18 and to the magnet winding 13. As the lever 122 has been depressed also, the trigger 52 will be free and the extension 68 will engage the detent 69, locking the slice support in toasting position in known manner.

The depression of lever 122, or 120, releases the trigger 52 as previously mentioned, tensions the coil spring 34, and rotates the pinion 17 through the medium of the rack 24. The pinion rotates shaft 15 and gear 16, and the latter rotates the pinion 38. The direction of rotation is clockwise as seen in Fig. 3. Due to the ratchet connection between the pinion and wheel 37, this rotation of the pinion can take place freely notwithstanding that the wheel 37 is prevented from rotating at this time. The lever 122 is depressed as far as it will go, the downward movement being limited by engagement with the handle 125 of the adjusting device. When the lever is released, it attempts to rise under the influence of spring 34, but such movement entails the counterclockwise rotation of pinion 38, which cannot take place without rotation of wheel 37. Since the wheel 37 is locked against rotation the lever 122 remains stationary in depressed position for the time being.

When the toaster is started up from a cold condition as assumed in the foregoing, the wheel 37 is prevented from rotating not only by an electromagnetic locking action which will be described, but also by the bi-metallic strip 48, which presses the armature 46 firmly against the rim of the wheel. This pressure on the wheel, in cooperation with the magnetic effect, is sufficient to entirely prevent the wheel from rotating. The strip 48 is secured directly to the inner casing, however, and also receives heat directly from the toasting compartment through slot 71, and heats up quite rapidly, therefore, with the result that it bends toward the casing and frees the armature 46. The strip 48 should be so arranged that this action will take place in about 20 seconds or thereabouts, depending on the characteristics of the toaster. When fully heated, the strip 48 will close the slot 71, and prevents the escape of heated air into the timing compartment.

As soon as the wheel 37 is released by the bi-metallic strip 48, it begins to rotate slowly from power supplied through the gear train by spring 34. The energization of coil 13 causes the armatures 45 and 46 to grip the rim of wheel 37 firmly; but twice in each cycle, or 120 times per second (if 60-cycle current is used) the current in the coil will fall to zero and reverse, and the direction of flux in the magnetic circuit will reverse. At each reversal the wheel 37 is momentarily released, but is instantly gripped again by the armatures 45 and 46. Due to the inertia of the parts and to the very short time interval during which movement is permitted, the angular distance which wheel 37 moves at each current reversal is minute, and the rotation of wheel 37 takes place very slowly.

It follows from the foregoing that the lever 122 will rise slowly during the timing operation, under control of wheel 37 and the associated electromagnet, and will eventually engage trigger 52 and move it upward. The bell crank lever is accordingly rotated on its pivot, and detent 69 is moved out of the path of extension 68, releasing the slice support, which rises to non-toasting position. At the same time the switch comprising contacts 76 and 77 is opened and the current is cut off.

After the toasted slices of bread have been removed, two more slices of bread may be inserted and the toasting operation may be repeated immediately. Levers 89 and 122 are both depressed as before and with the same result, except that in this case the timing device begins to function as soon as lever 122 is released, for the bi-metallic strip 48 has not had time to cool off. The second toasting operation is therefore terminated after a shorter interval than the first. Immediately succeeding toasting operations are timed the same as the second operation. However, if there is a substantial delay, enough to allow the toaster to cool down to such an extent that a longer time interval is required to complete a toasting operation, the bi-metallic strip will also cool off and will lock the timing device to delay starting thereof in the manner explained, thereby increasing the next toasting interval to the requisite extent.

In further explanation of the foregoing, I have determined by experiment that an automatic toaster of this type will heat up on the first toasting operation to a temperature which is substantially as high as the temperature which it reaches on subsequent operations. Furthermore, in the practical use of a toaster of this kind, when more than two pieces of toast are to be made, the successive toasting operations generally follow each other in quick succession, so that at the start of each operation the toaster is always cold or substantially fully heated. It follows, therefore, that a good uniform product can be turned out by merely providing means for suitably lengthening the first toasting interval each time the toaster is started up cold. The arrangement comprising the bi-metallic strip 48 accomplishes this object in a very satisfactory manner.

It is recognized, nevertheless, that a slight further temperature rise does take place during successive toasting operations until a maximum temperature is reached. This rise in temperature ordinarily will not cause appreciable difference in the toast, unless augmented by other factors such as a higher than normal voltage of the current supply, or a high temperature in the room where the toaster is being operated. In order to compensate for an abnormal temperature rise that may take place under such conditions, the resistance 18' and the contacts 49 and 50 are provided. These contact springs are normally closed and are controlled by the bi-metallic strip 58. This strip is mounted on the inner casing of the toaster and its temperature rises slowly as the temperature of the toaster rises. On heating the strip 58 bends toward the casing and the adjustment is such that before an excessive temperature is reached the contacts 49 and 50 are allowed to separate and resistance 18' is connected in series with the heating element 18. As a result the current consumption is lowered slightly, and further rise in temperature is prevented.

The timing device just described is surprisingly accurate. The rim of wheel 37 should be smooth and polished; likewise the pole faces of armatures 45 and 46. There may be a direct iron-to-iron contact at the wheel, as shown, but air gaps should be provided at some point in the magnetic circuit, as between the armatures and the core of the magnet.

In the design of the timing device, it is desirable to have the magnet of relatively high resistance so as to consume little current. The winding 13 may therefore include considerable resistance wire, only enough copper being used to give the requisite number of ampere turns. The spring 34 must have sufficient power to reliably trip the mechanism at the end of the toasting interval. The power of the magnet and size of spring 34 being determined in this manner, the desired time interval is secured by giving the wheel 37 the proper weight, which is determined by experiment in any given case, and by using the proper gear ratio in the gear train.

In the event that the timing device is to be used for some purpose that requires the rate of the timing device to be changed, this can be taken care of by interchangeable or adjustable weights for the wheel 37, which can be inserted in the threaded openings with which wheel 37 is provided, as shown in Fig. 3. The weights may be plain cylindrical plugs, threaded at one end. In the case of an automatic toaster, it is deemed preferable to make the wheels 37 of a uniform weight, calculated to give the proper time interval, and then adjust the toaster for light or dark toast by means of a device such as 125, which varies the length of the arc through which lever 122 is operated.

The timing device is substantially noiseless. The armatures 45 and 46 do not have any noticeable vibration, and rest at all times on the rim of wheel 37.

Fig. 4 shows a modified magnetic structure, in which the wheel 37' is not necessarily included in the magnetic circuit, and may be made of non-magnetic material if desired. That is, in this form of the invention the wheel 37' may be either of magnetic or non-magnetic material. As shown in the drawings, the structure includes the core 14', the coil 13', armatures 301 and 302 which are pivoted on the core, and a member 303 of magnetic material which completes the magnetic circuit. The armatures are provided with bearing faces 304 and 305 which may be made of hard fiber, for example, and which rest against the rim of wheel 37'.

Fig. 5 shows a further modification employing a thin, flat disc 310, which may be of non-magnetic material. The coil 313 has a core made of two iron or steel stampings which overlap each other throughout the length of the coil, as shown. The ends of these core stampings are located on opposite sides of the disc 310 and are in loose contact with it. The interposed disc forms a gap in the magnetic circuit.

The operation of the modified structures shown in Figs. 4 and 5 is similar to that of the structure shown in Fig. 3 and accordingly will be understood without further explanation.

Referring now to Figs. 6 and 7, the modified timing device shown in these figures will be described. The parts are mounted in a frame which comprises plates 201 and 202, and two spacers such as 203 at the top and other spacers such as 204 at the bottom, by means of which the plates are rigidly supported in spaced relation as shown.

Rotatably mounted in the frame is a shaft 15', on which are supported the gear wheel 16' and the pinion 17'. These parts are similar to the correspondingly numbered parts in Fig. 2.

Beneath the shaft 15' there is a shaft 218 which is fixed in the frame. Next to frame plate 202 there is rotatably supported on the shaft 218 a combined ratchet wheel and pinion comprising a hub 219, a pinion section 220 and a ratchet section 221. About the center of the shaft there is rotatably supported a hub 229 on which is mounted a disc 215. This disc has a stud 227 rigidly fixed to one side for the purpose of supporting the pawl 228. This pawl may be a flat spring and engages the ratchet section 221 on the rear side thereof as it is shown in the drawings.

Adjacent the frame plate 201 there is rotatably mounted on the shaft 218 a member comprising the head 222 and a threaded portion 226, the said member also having a short octagonal portion next the head on which the disc 216 is mounted. The disc 216 is also shown in Fig. 7, from which it will be seen that it has an octagonal opening at the center. The disc 216 lies against the head 222 and is held in position by the nut 225 which is threaded onto the portion 226.

The disc 216 is arranged to be rotated by a flexible connection to the hub 229 on which disc 215 is mounted. This connection comprises a spring 224, the inner end of which is secured to the hub 229 and the outer end of which is fastened to a pin 223 which projects to the right from the head 222. The spring 224 is arranged so that it will be wound or tightened by counterclockwise rotation of disc 215, as seen from the right.

The disc 216 is also mechanically associated with the disc 215 through the medium of a stud 217. This member is rigidly fixed to disc 215 and passes through one of the openings, such as 230 or 231, in disc 216. The stud 217 is accurately made of hardened steel and fits in the opening in disc 216, with a predetermined amount of play. The opening 230 may be, for example, .002 of an inch larger than the stud 217 and the other openings 231, etc., may progressively increase in size by .002 of an inch.

Supported on two brackets such as 205 there is a magnet core 207 having a winding 206. Just above the magnet is a cross member 209 on which is pivoted the armature 208 by means of a shoulder screw 210. The end of the armature which is opposite the magnet is bifurcated and comprises two slightly resilient members which extend between the discs 215 and 216 as shown. The bifurcated end of the armature is urged to the right by a spring 212 and normally clamps the disc 215 tightly against the fixed stud 214. In this position of the armature it is just out of contact with disc 216, which is accordingly free to move between the armature and the adjusting screw 213, except that its movement is prevented by the stud 217 on disc 215.

The foregoing describes the essential parts of this form of the timing device, which obviously can be substituted in the toaster shown in Fig. 1.

In the drawings, Fig. 6, the rack which operates with pinion 17' and the trigger mechanism for tripping the slice carrier have been omitted, but these parts may be the same as shown in Figs. 1 and 2.

Describing the operation now, when the operating lever 122 is depressed, the rack rotates the pinion 17' and gear 16' in a counterclockwise direction as viewed from the right. Gear 16' rotates pinion 220, which is permitted to rotate freely by the ratchet mechanism including ratchet wheel 221 and pawl 228. When the depressed operating lever is released, the power spring attempts to raise the lever and rotate pinion 17' and gear 16' in a clockwise direction, but pinion 220 driven by gear 16' cannot now rotate because it has to drive the disc 215 through the ratchet mechanism and the disc cannot rotate because it is clamped between armature 208 and stud 214.

The operating lever 89 is of course also depressed along with lever 122, and lowers the slice support, also closing the circuit to the heating element and to the magnet winding 206. On energizing, the magnet attracts armature 208, which releases disc 215 and at the same instant clamps disc 216 against the end of screw 213. When the disc 215 is released, it rotates slightly in a counterclockwise direction as seen from the right until stud 217 engages the other side of the opening in disc 216. Disc 215 can rotate no farther because disc 216 is now clamped against rotation. When the magnet deenergizes, the spring 212 instantly forces the bifurcated end of the armature 208 to the right, which releases disc 216 and at the same time clamps disc 215 against rotation. When disc 216 is released by the deenergization of the magnet, it follows disc 215; that is, it rotates under the influence of spring 224 and takes up the play between the stud 217 and the opening in the disc.

The operation continues as described, the magnet being energized at each half cycle to permit a slight advance of disc 215 and deenergizing each time the current reverses to permit a corresponding advance of disc 216. The tension in spring 212 should be adjusted with reference to the power of the magnet so as to insure that the intervals during which the two discs are free to move are approximately equal. This adjustment is not critical, however. The stroke of the armature is extremely short and this feature, together with the slight resiliency in the end members of the armature insures that on the energization of the magnet the disc 216 is clamped at the same time that the disc 215 is released, or at any rate before the stud 217 can complete its movement within the opening in disc 216.

From the foregoing it will be seen that the disc 215 will rotate in minute steps the length of which is determined by the difference between the diameter of the stud 217 and the diameter of the opening in disc 216. The disc accordingly rotates at a slow rate, permitting gear 16' and pinion 17' to rotate, which is accompanied by the rising of lever 122. The lever eventually trips the slice support to terminate the toasting operation in the manner previously described.

For an automatic toaster such as described herein, the size of the opening in disc 216 will depend on the gear ratio between gear 16' and pinion 220 and on the number of revolutions of pinion 17' within the adjustment range of lever 122. To show how this works out, it may be assumed that the opening in disc 216 is larger than the stud 217 by .006 of an inch. The disc 215 will therefore advance this distance 120 times per second, or .72 of an inch in one second, and 43.2 inches in one minute. If the opening is located on a circle, the circumference of which is 5 inches, the disc will rotate 8.64 times per minute, and if the gear ratio is 4 to 1, the gear 16' and pinion 17' will rotate approximately two times per minute. Since the toasting interval for a toaster of this type is about a minute and a half, or somewhat less, it will be seen that about three rotations of pinion 17' will be required, which is conveniently within the range of movement of the lever 122.

It will be clear from the foregoing that by making the discs 215 and 216 slightly larger and by using a smaller opening in disc 216 the gear reduction can be dispensed with.

When the timing device is used for other purposes, it may be necessary or desirable to change the rate, and to enable such change to be readily accomplished the disc 216 is provided with a plurality of openings of different sizes, as shown in Fig. 7. In order to effect the change, the nut 225 is backed off, the screw 213 is partly unscrewed, and the disc 216 is then moved to the left far enough so that it can be rotated to the proper position to bring the stud 217 in line with the desired opening. The openings may be marked in accordance with their sizes. After the disc 216 has been assembled as desired the nut 225 is tightened up again and screw 213 is readjusted.

This form of timing device, like the one shown in Figs. 1, 2, and 3, is substantially noiseless. It is entirely accurate; that is, the timing device itself is accurate, and errors can occur only by reason of variations in the frequency of the current supply. This form of the invention may therefore be used where very exact timing is necessary and may even be used in electric clocks.

The invention having been described, that which is thought to be new and for which the protection of Letters Patent is desired will be pointed out in the appended claims.

I claim:

1. In a timing device, a rotatable wheel or disc of magnetic material, means for driving said wheel, a magnetic circuit including said wheel and a brake member engaging the periphery thereof, and a winding energized by alternating current for setting up an alternating magnetic flux in said circuit to thereby produce an intermittent response of the wheel to said driving means.

2. In a timing device, a reciprocating member, a spring in which power is stored when said member is moved in one direction, said spring tending to restore said member, a rotatable member, means whereby said reciprocating member rotates said rotatable member when the reciprocating member restores, and a magnetic brake acting on said rotatable member, said brake being energized by alternating current and effective to prevent rotation of said rotatable member except when the current changes direction.

3. In a timing device, a rotatable disc or wheel, an electromagnet, movable pole pieces for said magnet engaging opposite points on the periphery of said disc, means for applying power to rotate said disc, and means for energizing said magnet by alternating current, whereby said pole pieces prevent rotation of the disc except at times when the current falls to zero.

4. In a timing device, a rotatable member, a setting member, means including a gear train connecting said rotatable member with said setting member, a ratchet included in said means permitting operation of said setting member while the rotatable member is stationary, a spring for returning said setting member and for driving said rotatable member through said gear train and ratchet, a magnet, an armature for said magnet engaging said rotatable member, and means for energizing said magnet by alternating current, whereby the said rotatable member is permitted to advance in short steps under control of said armature.

5. In a timing device, a rotatable member, means for driving said member, an electromagnet, stationary armatures for said magnet engaging said member on opposite sides thereof, and means for energizing said magnet by alternating current to cause said armatures to alternately lock and release said member while remaining in engagement therewith.

6. In a timing device, two rotatable members, resilient means whereby the first member drives the second member, electromagnetic means energized by alternating current for alternately frictionally clamping and releasing said members, and means whereby each member when clamped limits the movement of the other member when released.

7. In a timing device, two discs rotatable side by side on a common shaft, each disc having a uniform uninterrupted circular surface, a movable member adapted to engage said surfaces, means for rotating the first disc, a flexible connection through which the first disc drives the second, a pin or stud fixed to one disc and extending through an opening in the second disc, said opening being larger than said pin, and means including said member for alternately clamping and releasing said discs, whereby each disc rotates when it is released to an extent determined by the difference in the diameter of said pin and said opening.

8. In a timing device, a rotatable member, means for applying power to drive said member, and means for causing said member to respond to the applied power in minute steps, said means including an electromagnet energized by alternating current, a core for said electromagnet, an armature forming a non-rigid extension of said magnet core and engaging said rotatable member, and means for holding said armature against rotation with said member.

9. In a bread toaster which includes a slice carrier having toasting and non-toasting positions, means for locking said slice carrier when moved to toasting position, a timer including a moving part adapted to trip said locking means in a certain position, a rotatable member controlling movement of said part toward tripping position, and electromagnetic means energized by alternating current for controlling the movement of said rotatable member.

10. In a bread toaster which includes a slice carrier having toasting and non-toasting positions, means for locking said slice carrier when moved to toasting position, a timer including a rotatable member, means for driving said member, a magnetic brake energized by alternating current for controlling the rotation of said member, and means operated by said member for tripping said locking means.

11. In a bread toaster which includes a slice carrier having toasting and non-toasting positions, means for locking said slice carrier when moved to toasting position, a lever manually operable to timing position, a spring connected to said lever for restoring the same, tripping means engaged by said lever on restoring, a rotatable member controlling the restoring movement of said lever, and electromagnetic means energized by alternating current for controlling rotation of said rotatable member.

12. In a bread toaster, a toasting compartment, a timing device, means for starting said timing device at the beginning of a toasting operation if the toaster is hot, and means for delaying the starting of said timing device if the toaster is cold, said means including a bi-metallic strip supported on the outside of said compartment, and an opening in the wall of said compartment through which said strip receives heat which is adapted to be closed by the strip upon heating.

13. In a timing device, an electromagnet, an armature for said magnet, a rotatable member having a continuous circular surface concentric with its rotation axis and engaged by said armature, means for applying power to rotate said member on its said axis to move the said surface thereof continuously past said armature always in the same direction, and means for energizing said magnet by alternating current to cause said armature to exert a pressure against the said surface, the driving power and the power of said magnet being so related that the said member is unable to rotate in response to the driving power except for a brief instant each time when the current falls to zero.

14. In a timing device, a wheel or disc supported for rotation on a shaft, means for applying power to rotate said disc, an electromagnet energized by alternating current, means including said magnet for locking the disc against rotation except for a short interval each time the current in the magnet reverses its direction, the amount of rotation in each such interval depending on the inertia of the disc, and means for adjusting the effective weight of the disc to regulate the amount which the disc rotates in each interval.

15. In a timing device for measuring a predetermined time interval, an electromagnet energized by alternating current, a wheel or disc the weight of which is predetermined in accordance with the length of said time interval, means for rotating said disc on its axis, and means including said electromagnet for preventing rotation of said disc except during a short interval each time when the current in said magnet changes direction, the amount which said disc rotates each time depending on its inertia.

16. In a timing device for measuring a predetermined time interval, an electromagnet energized by alternating current, a wheel or disc the diameter of which is predetermined in accordance with the length of said time interval, means for rotating said disc on its axis, and braking means operated by said electromagnet for preventing rotation of said disc except for a short interval each time when the current in said electromagnet changes direction, said braking means including a part engaging the wheel at or near its periphery, whereby the number of rotations made by the disc during said time interval will depend on its diameter.

17. In a timing device, a rotatable member, means for applying power to rotate said member, means for causing said member to respond to the applied power in minute steps, said means including an electromagnet energized by alternating current, an armature for said magnet, and a brake member actuated by said armature and engaging said member, and means responsive to a predetermined extent of rotation by said member for interrupting the supply of alternating current to said magnet.

18. In a bread toaster, a heating element, means for supplying current to said element, a timer including a rotatable member, means for driving said member, a magnetic brake energized by alternating current for controlling the rotation of said member, and means controlled by said member and responsive to a predetermined amount of rotation of said member for interrupting the supply of current to said element.

19. In a bread toaster, a timer including a rotatable member, means for storing power to drive said member at the time a toasting operation is started, a magnetic brake energized by alternating current for controlling the rotation of said member, and means responsive to a predetermined amount of rotation of said member for terminating the toasting operation.

20. In a timing device, a wheel or disc controlling the operation of the timer, means for rotating said disc, an electromagnet energized by alternating current, a magnetic circuit including an armature for said magnet but excluding said disc, and a brake member pressed against said disc by said armature with sufficient force to prevent rotation of the disc except for a brief instant each time when the current in the magnet winding changes direction.

21. In a timing device, a thin, flat disc, means for rotating said disc about an axis coincident with the center thereof, an electromganet energized by alternating current, said electromagnet including pole pieces extending in overlapping relation on opposite sides of said disc near the edge thereof and in continuous contact therewith, said pole pieces being effective to grip the edge of the disc between them and prevent rotation of the disc when the electromagnet is energized and to release the disc momentarily each time the magnet is deenergized.

22. In a timing device, a rotatable disc, means for rotating said disc about an axis coincident with the center thereof, a magnetic circuit including a portion passing through the disc in a direction perpendicular to the plane thereof, said circuit including members continuously engaging opposite sides of the disc, and means for passing an alternating flux through said circuit.

23. In a noiseless timing device, a disc, means for rotating said disc about an axis coincident with the center thereof, an electromagnet energized by alternating current, a stationary armature for said magnet, and means supporting said armature with a part thereof in continuous alternate loose and firm engagement with said disc, whereby the disc is permitted to rotate in short steps without chattering of said armature.

24. In a timing device, two rotatable members, means for applying power to rotate one of said members, speed changing means coupling said members together, control means operated responsive to a predetermined rotation of the slowest rotating member, a braking device controlling the rotation of the fastest rotating member, said braking device including a part having a smooth surface in continuous engagement with a smooth circular surface of the said last mentioned member, and a magnet winding energized by alternating current for operating said braking device.

25. In a timing device, a rotatable disc, means for rotating said disc on an axis coincident with the center thereof, an electromagnet, means including an armature for said magnet for clamping the edge of said disc against a fixed support, thereby preventing rotation of the disc, means for energizing said magnet by alternating current, whereby the disc is intermittently released.

26. In a timing device, a rotatable disc, means for rotating said disc on an axis coincident with the center thereof, an electromagnet, means including an armature for said magnet for clamping the edge of said disc against a fixed support, thereby preventing rotation of the disc, means for energizing said magnet by alternating current, whereby the disc is intermittently released, and means under the control of said magnet for limiting the extent to which said disc can rotate each time it is released.

27. In a bread toaster which includes a slice carrier having toasting and non-toasting positions, means for locking said slice carrier when moved to toasting position, a timer including a member movable in a predetermined path, means for driving said member, a magnetic brake energized by alternating current for controlling the movement of said member, said brake including cooperating brake surfaces in continuous engagement, an electromagnet, and a stationary armature controlling the pressure with which said surfaces engage each other, whereby said member moves only during each reversal of said alternating current, and means operated by said member for tripping said locking means.

28. In a bread toaster, a timer including a movable member, means for storing power to move said member at the time a toasting operation is started, a magnetic brake energized by alternating current for controlling the movement of said member, said brake including cooperating brake surfaces in continuous engagement, an electromagnet, and a stationary armature controlling the pressure with which said surfaces engage each other, whereby said member moves only during each reversal of said alternating current, and means responsive to a predetermined amount of movement of said member for terminating the toasting operation.

JOHN ERICKSON.